United States Patent [19]

Schilling, Jr. et al.

[11] Patent Number: 4,783,516

[45] Date of Patent: Nov. 8, 1988

[54] POLYSILANE PRECURSORS CONTAINING OLEFINIC GROUPS FOR SILICON CARBIDE

[75] Inventors: Curtis L. Schilling, Jr., Croton-On-Hudson; Bernard Kanner, West Nyack, both of N.Y.

[73] Assignee: Union Carbide Corporation, Danbury, Conn.

[21] Appl. No.: 554,291

[22] Filed: Nov. 22, 1983

Related U.S. Application Data

[63] Continuation-in-part of Ser. No. 480,700, Mar. 31, 1983, abandoned.

[51] Int. Cl.$^4$ .................................................. C08G 77/06
[52] U.S. Cl. ......................................... 528/14; 528/32; 528/35; 556/430; 556/435; 526/173; 526/179; 423/345; 501/88
[58] Field of Search ............... 556/430, 435; 526/173, 526/179; 528/32, 35, 14; 423/345; 501/88

[56] References Cited

U.S. PATENT DOCUMENTS

| | | |
|---|---|---|
| 3,157,541 | 11/1964 | Heywang . |
| 3,853,567 | 12/1974 | Verbeek . |
| 3,892,583 | 7/1975 | Winter . |
| 4,052,430 | 10/1977 | Yajima . |
| 4,100,233 | 7/1978 | Yajima . |
| 4,105,455 | 8/1978 | Koga . |
| 4,110,386 | 8/1978 | Yajima . |
| 4,117,057 | 9/1978 | Yajima . |
| 4,122,139 | 10/1978 | Yajima . |
| 4,134,759 | 1/1979 | Yajima . |
| 4,147,538 | 4/1979 | Yajima . |
| 4,260,780 | 8/1981 | West . |
| 4,298,559 | 11/1981 | Baney . |
| 4,298,588 | 11/1981 | Pinto . |
| 4,310,481 | 1/1982 | Baney . |
| 4,310,482 | 1/1982 | Baney . |
| 4,310,651 | 1/1982 | Baney . |
| 4,312,970 | 1/1982 | Gaul . |
| 4,314,956 | 2/1982 | Baney . |
| 4,324,901 | 4/1982 | West . |
| 4,340,619 | 7/1982 | Gaul . |
| 4,414,403 | 11/1983 | Schilling, Jr. et al. ............ 556/435 |

OTHER PUBLICATIONS

Chem. Abst. 91 (1979) 124210S.
Chem. Abst. 91 (1979) 215596P.
Bull Soc Chem Jap 32 (1960) 1279.
Zhurnal Obshchei Khimii, vol. 47, No. 8, pp. 1756-1758 (1977).
Bull Soc. Chem. Jap. 39 (1966) 1279.
J. Organometallic Chem. 2 (1964) 369-371.
"Polysilane High Polymers with Olefinic Side Groups: Syntheses, Properties, and Addition of Hydrogen Halides", by Harlad Stuger and Robert West, Macromolecules vol. 18, No. 12, 1985, pp. 2349-2352.
"The Polysilane High Polymers", by Robert West, Journal of Organo-Metallic Chemistry, 300(1986) pp. 327-346.
Merk Index, 1976, p. 8312 (ninth edition).

*Primary Examiner*—Melvyn I. Marquis
*Attorney, Agent, or Firm*—Paul W. Leuzzi

[57] ABSTRACT

This invention is concerned with novel polysilanes containing olefinic groups which are prepared by reactions of halogen-containing organosilane monomers or mixtures thereof with sodium metal in an appropriate solvent or mixture of solvents. Such polysilane polymers are soluble and thermoplastic, and can be directly converted to silicon carbide compositions by pyrolysis at atmospheric pressure.

27 Claims, No Drawings 4,783,516

POLYSILANE PRECURSORS CONTAINING OLEFINIC GROUPS FOR SILICON CARBIDE

The U.S. Government has rights in this invention pursuant to Contract No. N00014-81-C-0682 awarded by the Office of Naval Research, Department of the Navy.

This application is a continuation-in-part of U.S. application Ser. No. 480,700 filed Mar. 31, 1983 now abandoned.

FIELD OF THE INVENTION

The present invention relates to novel polysilane compositions containing reactive olefinic groups, to their production from selected monomer systems, and to their use in the production of silicon carbide.

DESCRIPTION OF THE PRIOR ART

Silicon carbide has long been known and appreciated for its chemical inertness, high temperature stability, semi-conductor properties, and especially its extreme hardness. In fact, the hardness of silicon carbide approaches that of diamond and boron nitride.

Silicon carbide was originally prepared by reacting inorganic silicon materials, such as silica or sand, with a carbon source, such as coke or graphite, at extremely high temperatures. The silicon carbide from such reactions was generally intractable and infusible and could only be shaped into articles by mixing with an appropriate binder and reprocessing at high temperatures once again.

A lower temperature crystalline modification of silicon carbide has also been prepared in powdered form, either by gas phase or solid state reaction. While this form of silicon carbide is more sinterable than the high temperature form mentioned above, it is still unsuitable for the formation of finely shaped articles such as fibers. Silicon carbide also has been prepared by vapor deposition from chlorosilanes (see U.S. Pat. No. 3,157,541). This approach is useful for preparing purer grades of silicon carbide for the electronics industries, and has been used for the preparation of shaped articles, such as fibers.

Still more recently, Japanese workers have reported in U.S. Pat. No. 4,100,233 the preparation of shaped articles, particularly fibers by pyrolyses of preshaped polycarbosilanes. The latter are soluble and thermoformable by standard methods and are prepared by a prepyrolysis/rearrangement/polymerization of cyclic or linear polydimethylsilanes, which in turn can be prepared from $Me_2SiCl_2$ and active metals (see U.S. Pat. No. 4,052,430). These polycarbosilanes have numerous uses, being convertible to SiC in a variety of moldings and composites as taught in U.S. Pat. Nos. 4,110,386; 4,117,057; 4,122,139; 4,134,759; and 4,147,538. Other routes to preparing such polycarbosilanes have been disclosed by the same inventors in U.S. Pat. No. 4,159,259.

Another group of Japanese inventors has disclosed in U.S. Pat. No. 4,105,455 silicon carbide compositions derived from insoluble polycarbosilanes, which are also prepared by prepyrolysis of polydimethylsilanes.

A third Japanese group discloses in Chem. Abstracts, 91, (1979) 215596P the preparation of presumably branched polydimethylsilanes from mixtures of $Me_3SiCl$, $Me_2SiCl_2$, and $MeSiCl_3$; however these polydimethylsilanes still require a prepyrolytic conversion to polycarbosilane before ultimate conversion to silicon carbide. The latter research group also discloses reaction of a mixture of $Me_2SiCl_2$ and $CH_2=CHSiMeCl_2$ with sodium/potassium dispersion to give a copolymer in which the monomer units are connected by SiSi bonds (see Chem. Abstr., 91, 124210s (1979)).

Other approaches to silicon carbide precursors include copolymers of $Me_2SiCl_2$ and $OMeSiCl_2$ by R. West and co-workers (U.S. Pat. Nos. 4,260,780 and 4,324,901) and a polymeric residue from higher boiling by-products of the well known direct reaction of MeCl with silicon metal (U.S. Pat. No. 4,310,651). Silicon carbide has been prepared by pyrolysis of silicone resins and by pyrolysis of rice hulls, both of which would be low yield processes on a weight basis.

In related work, polycarbosilazanes have been pyrolyzed to shaped articles containing silicon carbide and silicon nitride, (see U.S. Pat. No. 3,853,567) with the polycarbosilazanes being prepared from prepyrolysis of carbosilazanes. Polysilazanes have been mixed with standard organic polymers and spun to fibers, which have been pyrolyzed to silicon nitride/silicon carbide fibers (see U.S. Pat. No. 3,892,583).

The polymeric residue employed as a silicon carbide source has been modified with a variety of agents to reduce chlorine content and increase safety toward handling or increase silicon carbide yields. These modifications are disclosed in U.S. Pat. Nos. 4,310,481; 4,310,482; 4,298,588; 4,314,956; 4,298,559; 4,340,619; and 4,312,970.

Branched polysilahydrocarbons have been prepared by free radical polymerization of unsaturated silanes such as $Me_xSi(CH_2CH=CH_2)_{4-x}$ where $x=0-2$, or $Me_3SiC_6H_4CH=CH_2$. These materials are highly cross-linked, infusible, and insoluble, but are thermally convertible to "carbonized substances containing silicon" (including SiC).

Recent work has shown that branched polycarbosilanes can be prepared in one step, and are directly convertible to silicon carbide by atmospheric pressure pyrolysis (U.S. patent application Ser. No. 361,106 filed Mar. 23, 1982, now U.S. Pat. No. 4,414,403. The ability of hydrosilyl (SiH) groups to provide in situ branching during thermal conversion of organosilicon polymers to SiC was also recognized as significantly increasing SiC yields. (U.S. patent application Ser. No. 479,745 filed Mar. 28, 1983, now U.S. Pat. No. 4,472,591.

Thus, there are now a variety of organosilicon routes to silicon carbide. The most critical prior art relating to the instant invention appears in U.S. Pat. Nos. 4,260,780; 4,324,901; Chem. Abstr. 91, 124210s (1979); and U.S. patent application Ser. Nos. 361,106 filed Mar. 23, 1982, now U.S. Pat. No. 4,414,403, and 479,745 filed Mar. 28, 1983, now U.S. Pat. No. 4,472,591.

The instant invention is distinct from prior art inventions through several compositional or process differences and many improved features. Thus, whereas a copolymer has been prepared from a 19.6/1 molar mixture of $Me_2SiCl_2/CH_2=CHSiMeCl_2$ using sodium/potassium alloy finely dispersed in toluene (see Chem. Abstr. 91, 124210s (1979), it yielded 86.1% of product of which only 15% was polymeric or nonvolatile at 195°/0.4 mm. It is known that potassium metal causes disilylation of vinylic silanes, and therefore it is unlikely that the vinyl groups survive the reaction discussed.

Copolymers of $Me_2SiCl_2$ and $OSiMeCl_2$ have been prepared using sodium metal in toluene (see U.S. Pat. Nos. 4,260,780 and 4,324,901). These copolymers are prepared in one step, are rich in phenyl groups, and do yield silicon carbide compositions on unconfined pyrolysis. The SiC yield, however, is substantially below that obtained from the preferred compositions of the instant invention. These phenyl-rich copolymers, trivially named "polysilastyrenes" are also reported to be photoactive, i.e., crosslink on exposure to light, which may lead to significant processing and shelf life limitations.

A terpolymer has been prepared from the reactants $Me_3SiCl$, $Me_2SiCl_2$, and $CH_2=CHSiMeCl_2$ using sodium metal in a toluene solvent as reported in Example 8 of U.S. Ser. No. 361,106, now U.S. Pat. No. 4,414,403. That terpolymer composition differs from the compositions of the present invention in that while the former was substantially an insoluble solid product, the latter are soluble thermoplastic products. Furthermore, the $Me_3SiCl$ reactant went largely unreacted in the process of Example 8 because it was present in an insufficient amount. Thus the resultant polymer is chemically distinct from that of the present compositions. The tentative assignment of the products of Example 8 as carbosilanes now appears to be incorrect. Example 6 of the same application discloses the formation of soluble and insoluble products from the same reactants, however these products are obtained using a potassium metal in a tetrahydrofuran solvent. The soluble product of Example 6 is a branched polycarbosilane which differs radically in structure from the polysilanes of the present invention insofar as the former contains tetra-functional —CHSiMe— groups derived from the $CH_2=CHSiMeCl_2$ reactants. It is now also clear that the products prepared from the same starting reactants using the process of the present invention provide higher yields of silicon carbide on pyrolysis than do the products of Example 6.

Teachings of the prior art have not allowed for a prediction as to whether olefinic groups react in the presence of chlorosilane groups and active metal to form silicon-carbon bonds. Thus, based on the prior art, the discovery that olefinic silane groups are largely unreactive under normal reaction conditions in the presence of chlorosilane groups and sodium metal was unexpected and unobvious.

It was also unobvious and unexpected that the polysilanes of the instant invention would be effective precursors for silicon carbide on unconfined pyrolysis. Linear or branched polydimethylsilanes do not yield silicon carbide in pyrolysis unless first thermally rearranged to polycarbosilanes. Although copolymers containing —$Me_2Si$— and —OSiMe— units do yield silicon carbide compositions on pyrolysis, the yields are lower than those of the instant invention.

Branched polycarbosilanes, wherein branching (a form of crosslinking) is incorporated during synthesis, are effective silicon carbide precursors, as are branched hydrosilyl-modified polycarbosilanes.

Finally, low molecular weight monovinylic and divinylic oligosilanes have been prepared from vinyl Grignard reagent and the corresponding chloropolysilanes in Bull. Soc. Chem Jap., 32, 1279 (1960). These compositions have not been reported as silicon carbide precursors on unconfined pyrolysis.

SUMMARY OF THE INVENTION

The present invention is concerned in part with the preparation of polysilanes in one step reactions from mixtures of halogen-containing olefinic organosilanes with the same or other organosilanes using a sodium metal in an appropriate solvent or mixture of solvents. The polysilanes prepared are new and useful compositions of matter, being directly convertible to silicon carbide ceramic compositions by atmospheric pressure The polysilanes prepared in accordance with the present invention are traceable and can be prepared with high proportions of reactive olefinic groups on backbone silicon atoms. Such preparations are accomplished by the use of sodium metal in an appropriate solvent or solvent blend. The polysilanes that result can by pyrolyzed directly to SiC compositions at atmospheric pressure and in higher yields than those obtained with tractable, linear polysilanes disclosed in prior art.

The latter property, i.e., the ability of these polysilanes to be converted to SiC by pyrolysis at atmospheric pressure is believed to be due to thermal reactions of the olefinic groups, causing in situ crosslinking during the early stages of pyrolysis. Such crosslinking creates backbone branching sites, resulting in high Si-C yields, consistent with prior art theory.

DETAILED DESCRIPTION

In the present invention, largely linear polysilanes, containing olefinic groups, are prepared by dechlorination of olefinic halosilanes, or mixtures of olefinic halosilanes with other halosilanes, using sodium metal in an appropriate solvent or mixture of solvents. Olefinic halosilanes may be represented by the formula:

$$R_xR'_ySi[(CH_2)_nX]_z \qquad (I)$$

wherein R is hydrogen or an alkyl, aryl or aralkyl group containing from one to ten carbon atoms, R' is an alkenyl group containing from two to eight carbon atoms, X is a halogen, n is zero or an integer, $x+y+z$ is equal to four, and y and z are individually at least one. The olefinic halosilanes may be reacted with non-olefinic halosilanes (i.e., $y=0$).

The general reaction can be represented as follows:

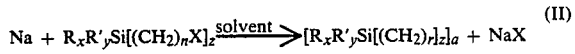

$$Na + R_xR'_ySi[(CH_2)_nX]_z \xrightarrow{\text{solvent}} [R_xR'_ySi((CH_2)_r]_z]_a + NaX \qquad (II)$$

In the preferred reaction of the present invention R is either methyl or hydrogen; R' is vinyl; n is equal to zero; and X is chlorine. Additionally, it is preferred sufficient vinylic halosilane be reacted to provide at least 5% of the silicon valences of the resultant polymer with R' groups. Although many other substituent groups may be employed, groups other than those listed above offer no advantage due to lower reactivity, lower yield in terms of polymer precursors, lower ultimate SiC yield, or lack of commercial availability. Monomers which would generate backbone branches may also be employed.

Preferred olefinic halosilanes include, but are not limited to, $CH_2=CHSiMe_2Cl$, $CH_2=CHSiMeCl_2$, $CH_2=CHSiCl_3$, and $CH_2=CHSiMe_2CH_2Cl$, with $CH_2=CHSiMeCl_2$ being most preferred for the preparation of linear methylvinylsilyl units (—$Si(CH_3)CH=CH_2$). Other halosilanes include, but are not limited to, nonolefinic silanes such as $(CH_3)_3SiCl$, $(CH_3)_2SiCl_2$, $CH_3SiHCl_2$, $(CH_3)_2SiHCl$, $SiCl_4$, $CH_3SiCl_3$, $Cl_3SiH$, $(CH_3)_3SiCH_2Cl$, $ClCH_2Si(CH_3)_2Cl$, $ClCH_2SiCH_3Cl_2$, $(ClCH_2)_2Si(CH_3)_2$, $Cl_2SiH_2$, and the like. Halodisilanes such as those derived from the direct reaction may also prove useful. Examples of such halodisilanes include but are not limited to Me$_2$ClSiSiClMe$_2$, MeCl$_2$SiSiClMe$_2$, MeCl$_2$SiSiCl$_2$Me, and the like.

Sodium is the only operative active metal for reasons of low cost, commercial availability, low hazard level (compared to potassium), and its unique reactivity. Other active metals, such as potassium, lithium and magnesium are more costly and will cause undesirable reactions involving the vinyl groups which in turn will not provide the novel polysilanes of the present invention. A slight molar excess of sodium is preferred to ensure consumption of chlorosilane groups. The sodium metal may be introduced into the reaction in any of a variety of forms, including, but not limited to, ingots, chunks, wire, powder, pellet and cylinder form.

The preferred solvent medium is an anhydrous solvent or solvent mixture unreactive with chlorosilanes or sodium, which has a boiling point (reflux temperature) above the melting point of sodium metal, i.e., 98° C. Additionally, the solvent or solvent mixture should allow for substantial incorporation of monofunctional silyl units from appropriate monomers. When a level of 20 mole percent or less of monofunctional silyl units are present in the monomer charge, a non-protic ether, such as tetrahydrofuran, dioxane, monoglyme, diglyme or the like, must be one of the solvents. Especially preferred are mixtures of tetrahydrofuran (THF) with aromatic hydrocarbons such as toluene or the xylenes or nonaromatic hydrocarbons such as octane. Lower boiling solvents or solvent mixtures may be used with pressurized equipment allowing for operation above the atmospheric boiling points, although with no apparent advantage. The solvent or solvent mixture should not produce olefinic reactivity.

The polysilane-forming reactions of the present invention can be run in standard laboratory glassware or commercial equipment, under inert atmospheres at atmospheric pressures, with provisions for external heating and cooling, stirring, and for incremental addition of mixtures of chloro-organosilane monomers. Thus, the process of the present invention regarding polysilane preparation is not narrowly critical with regard to equipment and pressure.

In a typical preparation, a weighed amount of sodium metal is placed in the anhydrous solvent mixture under an inert atmosphere. Heat is applied to reflux, melting the sodium, and addition of the halosilane mixture begun, with stirring. In certain cases, the different halosilane monomers may be added sequentially, rather than as mixtures. Alternatively, the sodium metal may be added as a liquid to the solvent mixture already at reflux. The reactions may be sufficiently exothermic at controlled addition rates to maintain reflux without continuous application of external heat. After completion of addition, heat may be reapplied for any specified time period.

Reaction conditions are thus not narrowly critical except that reaction temperature should be maintained above the melting point of sodium and below temperatures where unwanted reactions of the vinyl groups can occur (approximately 150° C.). Stirring should be vigorous to prevent caking of by-product salts. Reactions can be terminated after cooling by addition of dilute aqueous tetrahydrofuran (H$_2$O in THF) or other protic material such as low molecular weight alcohols or carboxylic acids. Salt by-products can be removed by filtration or water washing and the products isolated by methods familiar to those skilled in the art. Low molecular weight products, including di- and trisilanes can be removed by vacuum stripping or distillation.

The products may vary from low viscosity fluids to intractable, insoluble solids, depending on monomers chosen and the ratios in which they are used. The preferred products are soluble and thermoplastic and can be thermoformed or dissolved in a variety of solvents for purposes of melt spinning, solution spinning, or casting of films. By soluble what is meant is that the product is soluble in the inert solvent or solvent mixture described above.

The products are convertible to silicon carbide compositions by themselves or in mixtures with other components as described in prior art, simply by heating at an appropriate rate to 1200° C. or beyond.

In accordance with the present invention there is additionally provided a novel class of organosilicon polymers that are soluble and thermoplastic, said polymers are primarily comprised of units of the formula:

$$[R_xR'_ySi[(CH_2)_n\text{ }^9\text{ }_z]_a$$

wherein R, R', x, y, z and n are as previously defined and may vary from unit to unit within the polymer, a is at least five, and wherein at least 5% of the silicon valences of the total polymer are satisfied by R' groups, preferably 10%. This class of organosilicon polymer is convertible to silicon carbide compositions in greater yield than prior art polycarbosilanes.

The shaping, spinning, and casting of the polysilanes prepared according to the present invention can be performed in commercially available equipment designed for such purposes and known to those skilled in the art. Similarly, the pyrolyses are also performed in commercially available equipment designed for such work and also known to those skilled in the art. Sintering aids typical of such high temperature reactions may be employed if desired.

The preparative chemistry, involving dechlorination of chlorosilane groups by sodium metal, with concurrent formation of silicon-silicon bonds and sodium chloride can be represented by:

$$2\text{SiCl} + 2\text{Na} \xrightarrow{\text{solvent}} \text{SiSi} + 2\text{NaCl}$$

As unexpectedly determined in the instant invention, olefinic groups are largely unreactive towards sodium metal and CH$_2$=CHSiMeCl$_2$ yields largely difunctional methylvinylsilyl units in the polymer chain.

Hydrosilyl groups may be unreactive or may react as chlorosilyl groups such that CH$_3$SiHCl$_2$ may yield methylhydrosilyl groups or trifunctional methylsilyl groups.

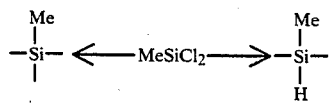

Chloromethyl groups react with chlorosilyl groups with the formation of silicon-carbon bonds.

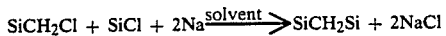

Chloromethyl groups may be present in monomer mixtures to a limited extent such that the major polymerization reaction is by formation of silicon-silicon bonds. When monomers with chloromethyl groups are used, there is a greater tendency to involve aromatic solvents into reaction products; toluene, for example, yields benzylic silane groups, and thus are not preferred.

In the instant invention, wherein sodium metal is preferably used with solvents consisting of non-protic ethers blended with octane, toluene or xylenes, the same olefinic halosilane reactant yields products containing difunctional olefinic silane groups, thus the original olefinic groups are retained in the products. Such products yield silicon carbide compositions on pyrolysis, thus the compositions and processes of the instant invention are greatly preferred for economic reasons and for safety reasons.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

PROCEDURE

All reactions were run in standard laboratory glassware of various sizes using heating mantles, mechanical stirrers with glass or stainless steel blades, thermometers, wet ice or cooled liquid condensers, and provisions for maintenance of argon or nitrogen atmospheres. Temperatures are reported in Centigrade degrees, and the abbreviations g, mm, ml, min, and hr represent gram, millimeter, milliliter, minute, and hour, respectively. Reported yields of precursor polymers are based on theoretical yields calculated from the silane mixture charged. All solvents are dried over molecular sieves.

EXAMPLES

Examples A–C are outside the scope of this invention but are included for comparative purposes. Examples 1–17 demonstrate the improved features of the instant invention.

EXAMPLE A

Reaction of 2.1/1 molar $MeSiCl/CH_3$=$CHSiMe_2$ with $Na_3$ in diglyme

In a 500 ml three-necked standard taper joint round-bottomed flask were combined 12.2 g (0.53 mol) of Na metal chunks and 201.8 g of anhydrous diglyme. Flask was fitted with an electric heating mantle, mechanical stirrer (stainless steel blade), addition funnel, Dewar condenser (containing toluene cooled by immersion coil through which ice water was circulated), thermometer, and valves to maintain an inert atmosphere (nitrogen). Heat was applied, melting the sodium, and addition of a mixture of 54.8 g (0.5 mol) of $Me_3SiCl$ and 24.3 g (0.24 mol) of $CH_2$=$CHSiMe_3$ begun at 115°, and continued, with continuous heating, at a rate which maintained the reflux temperature above 98°. Heating at reflux (115° C.) continued for 8 hr, and standing at room temperature for 32 hr, followed by termination by slow addition of a solution of 16.0 g $H_2O$ in 57.7 g diglyme and neutralization with 5 g conc HCl in 26.8 g diglyme. Salts were removed by filtration, and the organic layer vacuum distilled, yielding 4.65 g (7.9%) of $Me_3SiCH_2CH(SiMe_3)_2$, identified by VPC/NMR, plus 39.6% of $Me_3SiOSiMe_3$ and 6.2% of $Me_3SiSiMe_3$.

When similar reactions were run using toluene as solvent, dioxane as solvent, 7/1 toluene/tetrahydrofuran as solvent, or di-n-butylether as solvent, no product corresponding to $Me_3SiCH_2CH(SiMe_3)_2$ was detected. The same reaction, using K metal in tetrahydrofuran, yields 77.4% of $Me_3SiCH_2CH(SiMe_3)_2$.

EXAMPLE B

Reaction of 2.1/1 molar $Me_3SiCl/CH_2$=$CHSiMe_2O$ with Na in diglyme

The procedure of Example A was followed using 9.7 g (0.42 mol) of Na metal, 197.1 g of anhydrous diglyme, 43.5 g (0.4 mol) of $Me_3SiCl$, and 31.1 g (0.19 mol) of $CH_2$=$CHSiMe_2O$. Reaction followed by workup yielded 43.9% recovered $CH_2$=$CHSiMe_2O$ and 26.8% of $Me_3SiCH_2CH(SiMe_3)SiMe_2O$, identified by NMR and mass spectroscopy.

This Example and Example A show that vinylic silanes can be silylated under certain conditions using sodium metal.

EXAMPLE 1

Reaction of 2/1 $Me_3SiCH_2Cl/CH_2$=$CHSiMeCl_2$ with Na in toluene/THF

In a 1 l three-necked standard taper joint round-bottomed flask were combined 173 g of toluene, 27.2 g of tetrahydrofuran (THF), and 24.7 g (1.07 mol) of Na metal chunks. The flask was fitted with an electric heating mantle, mechanical stirrer with stainless steel blade, thermometer, Dewar condenser (containing toluene cooled by immersion coil through which ice water was circulated), addition funnel, and valves to maintain an inert nitrogen atmosphere. Heat was applied, melting the sodium, and addition of a mixture of 62.8 g (0.51 mol) of $Me_3SiCH_2Cl$ and 36.1 g (0.26 mol) of $CH_2$=$CHSiMeCl_2$ begun and continued at a rate maintaining the reflux temperature at 99° or above. After completion of addition (52 min), reaction was heated at reflux for 3 hr, 20 min, followed by cooling on wet ice bath, termination by dropwise addition of a solution of 5.3 g $H_2O$ in 15.2 g THF, and neutralization with concentrated hydrochloric acid solution. Solids were removed by filtration, triturated with THF and refiltered. Dissolution in $H_2O$ of the filtered solids left no insoluble organic products. The organic reaction mixture was dried over $MgSO_4$, stripped of solvents, and vacuum distilled, yielding 37.4 g (62.0%) of liquid products, b.p. up to 92°/0.32 mm, and 14.1 g (23.4%) of thermoplastic polymer, consisting primarily of $Me_3SiCH_2$— units, —$MeSi(CH$=$CH_2)$— units, and benzyl units. Pyrolysis of the polymer to 700° left 7.4% of silicon carbide composition. The major liquid products were identified by nuclear magnetic resonance spectrometry and mass spectrometry as $OCH_2CH_2SiMe_3$, $OCH_2SiMe(CH$=$CH_2)CH_2SiMe_3$, and $Me_3SiCH_2[SiMe(CH$=$CH_2)]_xCH_2SiMe_3$ where x is 1 or 2. Thus while this is within the broadest teaching of the invention, it is not preferred, as shown by the results, because n=1.

EXAMPLE 2

Reaction of 2/1 Me$_3$SiCl/CH$_2$=CHSiMeCl$_2$ with Na in toluene/THF

The procedures and analyses of Example 1 were followed using 171.6 g of toluene, 26.6 g of THF, 34.0 g (1.48 mol) of Na, 76.4 g (0.7 mol) of Me$_3$SiCl and 49.7 g (0.35 mol) of CH$_2$=CHSiMeCl$_2$. Work-up yielded liquid products, 15.5% yield b.p. up to 71°/0.03 mm and 35.6% yield thermoplastic polymer. Pyrolysis of the latter to 1200° C. yielded 38.5% of silicon carbide composition. The polymer consisted primarily of Me$_3$Si— units and —MeSi(CH=CH$_2$)— units; the major liquid products were Me$_3$Si[SiMe(CH=CH$_2$)]$_x$SiMe$_3$ where x is 2 or 3.

EXAMPLE 3

Reaction of 2/1 Me$_3$SiCH$_2$Cl/CH$_2$=CHSiMeCl$_2$ with Na in xylene/THF

The procedures and analyses of Example 1 were repeated usig 170.3 g of commercial xylenes, 25.0 g of THF, 20.3 g (0.88 mol) of Na, 51.8 g (0.42 mol) of Me$_3$SiCH$_2$Cl and 29.7 g (0.21 mol) of CH$_2$=CHSiMeCl$_2$. Work-up yielded 13.5 g of insoluble solid product (27.1%), 21.8 g of soluble thermoplastic polymer (44.0%), and 4.3 g (8.7%) of liquid products, b.p. up to 90°/0.36 mm. The soluble thermoplastic polymer, consisting primarily of Me$_3$SiCH$_2$— units, —MeSi(CH=CH$_2$)— units, and xylyl units, was pyrolyzed to 700° leaving 18.9% of silicon carbide composition. The major liquid products were isomers of xylyl —CH$_2$SiMe$_3$, isomers of xylyl —SiMe(CH=CH$_2$)CH$_2$SiMe$_3$, isomers of di(xylyl)SiMeCH=CH$_2$, and Me$_3$SiCH$_2$-[SiMe(CH=CH$_2$)]$_x$CH$_2$SiMe$_3$ where x is 1 or 2. Thus while this is within the broadest teaching of the invention, it is not preferred, as shown by the results, because n=1.

EXAMPLE 4

Reaction of 1.5/1 Me$_3$SiCl/CH$_2$=CHSiMeCl$_2$ with Na in toluene/THF

The procedures of Example 1 were repeated with 170.7 g of toluene, 25.4 g of THF, 25.0 g (1.09 mol) of Na, 48.1 g (0.44 mol) of Me$_3$SiCl, an 41.9 g (0.3 mol) of CH$_2$=CHSiMeCl$_2$. Work-up yielded 2.4 g (4.5%) of insoluble solid product, 21.8 g (41.2%) of soluble thermoplastic polymer, and 12.9 g (24.3%) of liquid products, b.p. up to 115°/0.56 mm. The soluble thermoplastic polymer and the liquid products were structurally similar to those of Example 2. Pyrolysis of the soluble solid to 1200° yielded 47.9% of silicon carbide composition. Substantially, equivalent results were obtained when the reaction was repeated using octane/THF instead of toluene/THF.

EXAMPLE 5

Reaction of 1.5/1 Me$_3$SiCl/CH$_2$=CHSiMeCl$_2$ with Na in xylenes/THF

The reaction of Example 4 was repeated except that xylenes were used instead of toluene, i.e., 240.8 g of xylenes, 51 g of THF, 49.1 g (2.13 mol) of Na, 94.6 g (0.87 mol) of Me$_3$SiCl, and 83.5 g (0.59 mol) of CH$_2$=CHSiMeCl$_2$. Work-up yielded 39.0% (40.3 g) of soluble thermoplastic polymer and 27.7% (28.7 g) of liquid products, b.p. up to 118°/0.6 mm. Products were structurally the same as those of Example 4. Pyrolysis of the soluble thermoplastic polymer to 1200° yielded 34.9% of silicon carbide composition. The presence of microcrystalline β-SiC was confirmed by x-ray diffraction.

EXAMPLE 6

Reaction of 1.0/0.3/1.0 Me$_3$SiCl/MeSiHCl$_2$/CH$_2$=CHSiMeCl$_2$ with Na in xylenes/THF The procedures and analyses of Example 1 were followed, using 170.5 g of xylenes, 26.5 g of THF, 28.0 g (1.22 mol) of Na, 31.1 g (0.29 mol) of Me$_3$SiCl, 11.7 g (0.10 mol) of MeSiHCl$_2$, and 41.4 g (0.29 mol) of CH$_2$=CHSiMeCl$_2$. Work-up yielded 8.3 g (17.1%) of insoluble solid, 37.0 g (75.8%) of soluble thermoplastic polymer, and 2.8 g (5.7%) of liquid products, b.p. up to 110°/1.0 mm. Pyrolysis of the soluble thermoplastic polymer to 1200° yielded 64.5% of ceramic composition. The presence of microcrystalline β-SiC was confirmed by x-ray diffraction. The liquid products included Me$_3$Si[SiMe(CH=CH$_2$)]$_x$[SiMeH]$_y$SiMe$_3$, x=1–3, y=0 or 1.

EXAMPLE 7

Reaction of 0.85/0.3/1.0 Me$_3$SiCl/Me$_2$SiCl$_2$/CH$_2$=CHSiMeCl$_2$ with Na in xylenes/THF The procedures and analyses of Example 1 were employed, starting with 510.2 g of xylenes, 77.2 g of THF, 91.1 g (3.96 mol) of Na, 100.8 g (0.93 mol) of Me$_3$SiCl, 42.4 g (0.33 mol) of Me$_2$SiCl$_2$, and 154.2 g (1.09 mol) of CH$_2$=CHSiMeCl$_2$. Work-up yielded 20.3% (33.2 g) of liquid products, b.p. up to 128°/1.5 mm, and 103.7 g (63.5%) of soluble thermoplastic polymer. Pyrolysis of the latter to 1200° yielded 49.5% of silicon carbide composition, showing the x-ray diffraction pattern for microcrystalline β-SiC. The soluble thermoplastic polymer was a polymer consisting primarily of Me$_3$Si— units, —Me$_2$Si— units, and —SiMe(CH=CH$_2$)— units.

Substantially similar results were obtained when dioxane, monoglyme and diglyme were substituted for the THF.

EXAMPLE 8

Reaction of 1.5/1 Me$_3$SiCl/CH$_2$=CHSiMeCl$_2$) with Na in toluene

The reaction of Example 4 was repeated using toluene alone as the solvent, i.e., 402.7 g of toluene, 44.4 g (1.93 mol) of Na, 85.5 g (0.79 mol) of Me$_3$SiCl, and 74.2 g (0.53 mol) of CH$_2$=CHSiMeCl$_2$. Work-up yielded 30.1 g (31.9%) of insoluble solid, 19.6 g (20.8%) of soluble thermoplastic polymer, and 6.8 g (7.2%) of liquid products, b.p. up to 107°/0.65 mm. Pyrolysis of the soluble thermoplastic polymer to 1200° yielded 49.6% of silicon carbide composition. While the products of Example 4 and this example are structurally very similar, the use of THF in Example 4 provided a higher yield of liquid and soluble thermoplastic polymer (65.5% total) than did this example (28.0%). The higher yield of thermoplastic polymer relates to a higher total yield of silicon carbide based on raw materials, and is desirable.

EXAMPLE 9

Reaction of 1/1 Me$_3$SiCl/CH$_2$=CHSiMeCl$_2$ with Na in xylenes/THF

The procedures and analyses of Example 1 were followed, using 510.1 g of xylenes, 76.5 g of THF, 96.8 g (4.21 mol) of Na, 145.0 g (1.34 mol) of Me$_3$SiCl and 188.4 g (1.34 mol) of CH$_2$=CHSiMeCl$_2$. Work-up yielded 57.4 g (30.0%) of soluble thermoplastic polymer and 47.6 g (24.9%) of liquid products, b.p. up to 132°/1.0 mm. Pyrolysis of the soluble thermoplastic polymer yielded 41.6% of silicon carbide composition (1200° pyrolysis). Pyrolysis of a liquid fraction, b.p. 106°–132°/1.0 mm, consisting of primarily of Me$_3$Si[-SiMe(CH=CH$_2$)]$_x$SiMe$_3$, where x=2, (24.1%) and x=3 (69.6%), to 1200° yielded 20.1% of silicon carbide composition. The latter result shows that low molecular weight, liquid polymethylvinylsilanes can be effective silicon carbide precursors, although less effective than thermoplastic polymers.

EXAMPLE 10

Reaction of 1/1 Me$_2$SiCl$_2$/CH$_2$=CHSiMeCl$_2$ with Na in xylene/THF

The procedures and analyses of Example 1 were employed, beginning with 516.1 g of xylenes, 75.9 g of THF, 107.9 g (4.69 mol) of Na, 144.1 g (1.12 mol) of Me$_2$SiCl$_2$ and 157.5 g (1.12 mol) of CH$_2$=CHSiMeCl$_2$. Work-up yielded 23.7 g (16.6%) of insoluble solid, 57.4 g (40.1%) of soluble thermoplastic polymer, and 1.4 g (1.0%) of liquid products, b.p. up to 95°/1.0 mm. The insoluble solid was pyrolyzed to 1200°, yielding 56.6% of silicon carbide composition. The soluble thermoplastic polymer, consisted primarily of —Me$_2$Si— units and —SiMe(CH=CH$_2$)— units, and yielded 49.6% of silicon carbide composition on pyrolysis to 1200°.

EXAMPLE C

Reaction of 1/1 Me$_2$SiCl$_2$/OSiMeCl$_2$ with Na in toluene/THF

A "polysilastyrene" was prepared using the procedures of Example 1, starting with 341.9 g of toluene, 51.9 g of THF, 71.4 g (3.1 mol) of Na, 95.5 g (0.74 mol) of Me$_2$SiCl$_2$, and 14.4 g (0.74 mol) of OSiMeCl$_2$. Work-up yielded 126.1 g of soluble solid (95.7%). Pyrolysis of the soluble thermoplastic polymer to 1200° yielded 18.0% of silicon carbide composition. While this example is also outside the scope of this invention, it demonstrates that the polysilastyrene compositions of U.S. Pat. No. 4,260,780 and U.S. Pat. No. 4,324,901 are less effective precursors for silicon carbide than are preferred embodiments of the present invention.

EXAMPLE 11

Reaction of 1/1 ClCH$_2$SiMe$_2$Cl/CH$_2$=CHSiMeCl$_2$ with Na in xylenes/THF The procedures and analyses of Example 1 were followed, beginning with 341.4 g of xylenes, 52.0 g of THF, 43.4 g (1.89 mol) of Na, 64.2 g (0.45 mol) of ClCH$_2$SiMe$_2$Cl, and 63.3 g (0.45 mol) of CH$_2$=CHSiMeCl$_2$. Work-up yielded 14.4 g (22.6%) of insoluble solid, 28.6 g (44.8%) of soluble thermoplastic polymer, and 3.3 g (5.2%) of liquid products, b.p. up to 90°/0.52 mm. Pyrolysis of the soluble thermoplastic polymer to 1200° yielded in 33.8% of silicon carbide composition. The soluble thermoplastic polymer consisted primarily of —CH$_2$SiMe$_2$— units, —SiMe(CH=CH$_2$)— units and xylyl units. The major liquid products include xylyl —SiMe$_3$ isomers, xylyl —SiMe(CH=CH$_2$)SiMe$_3$ isomers, (CH$_2$SiMe$_2$)$_2$SiMeCH=CH$_2$, and (CH$_2$SiMe$_2$)$_x$(SiMeCH=CH$_2$)$_y$ where x+y=4.

EXAMPLE 12

Reaction of 0.5/1/1 Me$_3$SiCl/Me$_2$SiCl$_2$/CH$_2$=CHSiMeCl$_2$/with Na in toluene/THF The procedures and analyses of Example 1 were repeated, using 339.6 g of toluene, 50.1 g of THF, 72.9 g (3.17 mol) of Na, 32.8 g (0.30 mol) of Me$_3$SiCl, 78.1 g (0.61 mol) of Me$_2$SiCl$_2$, and 85.2 g (0.60 mol) of CH$_2$=CHSiMeCl$_2$. Work-up provided 4.5 g (4.5%) of insoluble solid, 66.6 g (67.0%) of soluble thermoplastic polymer, and 11.3 g (11.3%) of liquid products, b.p. up to 102°/0.73 mm. Pyrolysis of the soluble thermoplastic polymer, which was a polymer consisting of primarily of Me$_3$Si— units, —Me$_2$Si— units, and —SiMe(CH=CH$_2$)— units, to 1200° yielded 43.5% of silicon carbide composition.

When these results are compared to those of Example 8, U.S. Ser. No. 361,106, wherein the same reaction is run using toluene alone as the solvent, it becomes clear that the use of THF with toluene provides for a much higher yield of tractable products. (The yield of insoluble solid is 62.9% in Example 8, U.S. Ser. No. 361,106, now U.S. Pat. No. 4,414,403). When these results are compared to Example 6, U.S. Ser. No. 361,106, now U.S. Pat. No. 4,414,403, wherein K metal in THF is used, it becomes clear that the use of Na in toluene/THF provides for both a higher yield of soluble thermoplastic polymer and a higher pyrolytic yield of silicon carbide.

EXAMPLE 13

Reaction of 1/1/1 CH$_2$=CHSiMe$_2$Cl/Me$_2$SiCl$_2$/CH$_2$=CHSiMeCl$_2$ with Na in toluene/THF The procedures and analyses of Example 1 were employed, beginning with 347.4 g of toluene, 51.5 g of THF, 56.5 g (2.46 mol) of Na, 56.4 g (0.47 mol) of CH$_2$=CHSiMe$_2$Cl, 60.3 g (0.47 mol) of Me$_2$SiCl$_2$, and 65.9 g (0.47 mol) of CH$_2$=CHSiMeCl$_2$. Work-up yielded 5.2 g (5.2%) of insoluble solid, 58.8 g (59.0%) of soluble thermoplastic polymer, and 23.9 g (23.9%) of liquid products, b.p. up to 117°/0.63 mm. Pyrolysis of the soluble thermoplastic polymer to 1200° yielded 40.7% of silicon carbide composition. The soluble thermoplastic polymer consisted of CH$_2$=CHSiMe$_2$— units, —SiMe$_2$— units, and —SiMe(CH=CH$_2$)— units. The major liquid products contain combinations of the same structural units as in CH$_2$=CHSiMe$_2$SiMe$_2$SiMe$_2$CH=CH$_2$.

EXAMPLE 14

Reaction of 1.33/1 Me$_3$SiCl/CH$_2$=CHSiMeCl$_2$ with Na in xylenes/THF

The procedures of Example 1 were used, starting with 338.3 g of xylenes, 48.5 g of THF, 23.3 g (1.01 mol) of Na, 43.0 g (0.4 mol) of Me$_3$SiCl, and 42.3 g (0.3 mol) of CH$_2$=CHSiMeCl$_2$. The procedure, however, was modified in that the Me$_3$SiCl was added first to the refluxing toluene/THF/Na mixture; followed by the CH$_2$=CHSiMeCl$_2$. The standard work-up yielded 1.8 g (3.6%) of insoluble solid, 23.7 g (47.2%) of soluble thermoplastic polymer, and 12.9 g (25.8%) of liquid products, b.p. up to 96°/0.52 mm. Polymeric and liquid products were structurally the same as those of Examples 2, 4, 5, 10 and 11. Pyrolysis of the soluble thermoplastic polymer to 1200° provided 47.1% of silicon carbide composition. This example shows that Me$_3$SiCl does not react rapidly under these conditions to form Me$_3$SiSiMe$_3$, but is incorporated into polymeric structures by the more reactive CH$_2$=CHSiMeCl$_2$.

EXAMPLE 15

Reaction of 0.5/5/1.0 Me$_3$SiCl/Me$_2$SiCl$_2$/CH$_2$=CHSiMeCl$_2$ with Na in xylenes/THF The reaction of Example 7 was repeated except that a 0.5/0.5/1.0 molar ratio of monomers was used. Work-up yielded 15.2% of liquid products, b.p up to 130°/1.3 mm, 54.3% of soluble thermoplastic polymer, and 5.6% of insoluble solid product. Pyrolysis of the soluble thermoplastic polymer to 1200° provided 51.0% of silicon carbide composition.

EXAMPLE 16

Reaction of 1/1 Me$_2$SiHCl/CH$_2$=CHSiMeCl$_2$ with Na in xylenes/THF

The procedures and analyses of Example 1 were followed, using 339.8 g of xylenes, 51.4 g of THF, 42.3 g (1.84 mol) of Na, 55.3 g (0.58 mol) of Me$_2$SiHCl, and 82.4 g (0.58 mol) of CH$_2$=CHSiMeCl$_2$. Work-up provided 12.1 g. (16.1%) of liquid products, 45.9 g (60.9%) of soluble thermoplastic polymer, and several g of insoluble solid. Pyrolysis of the soluble thermoplastic polymer to 1200° yielded 42.2% of silicon carbide composition. The most volatile reaction product, b.p. 58°/0.69 mm, was identified as HMe$_2$Si[SiMe(CH=CH$_2$)]$_2$SiMe$_2$H by VPC/NMR.

EXAMPLE 17

Reaction of 1/1 CH$_2$=CHSiMe$_2$Cl/CH$_2$=CHSiMeCl$_2$ with Na in Toluene/THF

The procedures and analyses of Example 1 were repeated, beginning with 346.0 g of toluene, 52.7 g of THF, 42.2 g (1.84 mol) of Na, 70.4 g (0.58 mol) of CH$_2$=CHSiMe$_2$Cl, and 82.2 g (0.58 mol) of CH$_2$=CHSiMeCl$_2$. Work-up yielded 4.9 g (5.4%) of liquid products, b.p. up to 100°/0.78 mm, 18.3 g (20.3%) of soluble thermoplastic polymer, and 19.1 g (21.1%) of insoluble solid. Pyrolysis of the soluble thermoplastic polymer to 1200° provided 44.4% of amorphous silicon carbide composition.

We claim:

1. A largely linear thermoplastic polysilane which consists essentially of units of the formula:

$$[R_xR'_ySi]_a$$

wherein
R is hydrogen or an alkyl, aryl or aralkyl group containing from one to ten carbon atoms, R' is an alkenyl group containing from two to eight carbon atoms, the sum of x+y is two or three, and a is equal to or greater than 5, and wherein R, R', x and y may vary unit to unit within the polysilane and at least 5% of the silicon valences of the thermoplastic silane are satisfied by the group R'.

2. The polysilane of claim 1 wherein R is hydrogen or a methyl group.

3. The polysilane of claim 1 wherein R' is a vinyl group.

4. A thermoplastic polysilane consisting essentially of
(i) largely linear units of the formula:

$$[R_xR'_ySi]_a$$

wherein
R is hydrogen or an alkyl, aryl or aralkyl group containing from one to ten carbon atoms, R' is an alkenyl group containing from two to eight carbon atoms, the sum of x+y is two or three, a is equal to or greater than 5,
(ii) units of the formula [R$_x$Si], wherein at least 5% of the silicon valences of the total thermoplastic mixture are satisfied by the group R' and R, R' x and y may vary unit to unit; and.

5. The mixture of claim 4 wherein R is hydrogen or a methyl group.

6. The mixture of claim 4 wherein R' is a vinyl group.

7. The mixture of claim 4 wherein R is hydrogen or a methyl group and R' is a vinyl group.

8. The mixture of claim 4 wherein at least 10% of the silicon valences of the total thermoplastic mixture are satisfied by the group R'.

9. The mixture of claim 8 wherein R is hydrogen or a methyl group, and R' is a vinyl group.

10. A process for preparing a largely linear thermoplastic polysilane which consists essentially of reacting olefinic silane monomers of the formula $$R_xR'_ySi[X]_z$$

wherein R is hydrogen or an alkyl, aryl or aralkyl group containing from one to ten carbon atoms, R' is an alkenyl group containing from two to eight carbon atoms, X is a halogen atom, y has a value of at least one, z has a value of at least one, and the sum of x, y and z is equal to four; or
a mixture of said olefinic silane monomers and non-olefinic halosilanes, such that at least 5% of the silicon valences of the total mixture of olefinic silane monomers and non-halosilanes are satisfied by R' groups;
with sodium metal in the presence of an inert solvent mixture, consisting of a non-protic ether and a hydrocarbon solvent wherein such inert solvent mixture has a reflux temperature above 98° C., and wherein said reaction is conducted at a reaction temperature above the melting point of said sodium metal and below the temperature where unwanted side reactions of the alkenyl group occurs.

11. The process of claim 10 wherein R is a methyl group.

12. The process of claim 10 wherein R' is a vinyl group.

13. The process of claim 10 wherein X is a chlorine atom.

14. The process of claim 10 wherein R is a methyl group, R' is a vinyl group, X is a chlorine atom and z has a value of two.

15. The process of claim 10 wherein the non-protic ether is selected from the group consisting of tetrahydrofuran, dioxane, monoglyme and diglyme.

16. The process of claim 10 wherein the hydrocarbon solvent is octane.

17. The process of claim 10 wherein the hydrocarbon solvent is an aromatic hydrocarbon solvent.

18. The process of claim 17 wherein the aromatic hydrocarbon solvent is toluene or xylene.

19. The process of claim 10 wherein the reaction is conducted at a temperature ranging from 98° C. to 150° C.

20. The process of claim 10 wherein the olefinic silane monomer is $CH_2=CHSi(CH_3)Cl_2$ and the non-olefinic halosilane is $(CH_3)_3SiCl$.

21. The process of claim 20 wherein the ratio of olefinic silane monomer to non-olefinic halosilane is 1:2.

22. The process of claim 20 wherein the ratio of olefinic silane monomer to non-olefinic halosilane is 1:1.5.

23. The process of claim 10 wherein the olefinic silane monomer is selected from the group consisting of $CH_2=CHSi(CH_3)Cl_2$ and $CH_2=CHSi(CH_3)_2Cl$, and the non-olefinic halosilane is selected from the group consisting of $(CH_3)_3SiCl$, $(CH_3)_2SiCl_2$, $(CH_3)_2SiHCl$ and $CH_3SiHCl_2$.

24. The process of claim 10 wherein the olefinic silane monomer is $CH_2=CHSi(CH_3)Cl_2$, and the non-olefinic halosilanes are $(CH_3)_3SiCl$ and $CH_3SiHCl_2$.

25. The process claim 10 wherein the olefinic silane monomer is $CH_2=CHSi(CH_3)Cl_2$ and the non-olefinic halosilanes are $(CH_3)_3SiCl$ and $(CH_3)_2SiCl_2$.

26. A process for the production of silicon carbide comprising pyrolyzing the composition of claim 1 under an inert atmosphere or in a vacuum.

27. The silicon carbide produced according to the process of claim 26.

* * * * *